V. FALCO.
AUTOMATIC PISTOL.
APPLICATION FILED APR. 18, 1913.
1,089,195.
Patented Mar. 3, 1914.
3 SHEETS—SHEET 1.
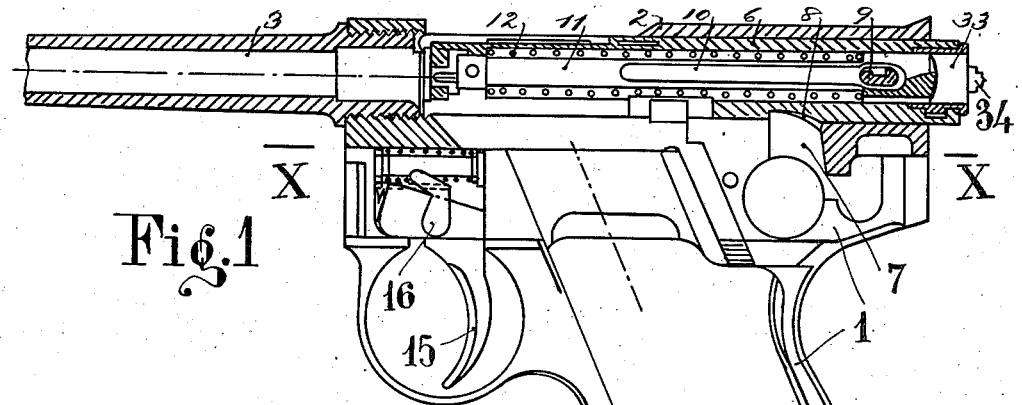
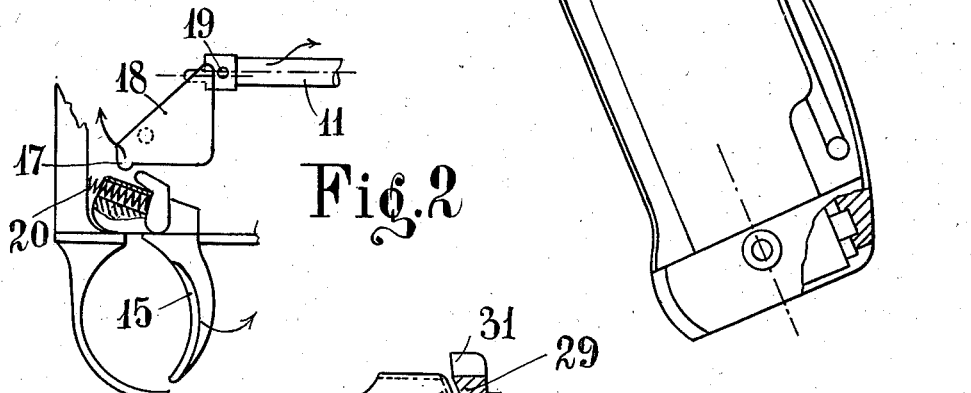
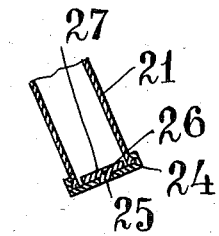
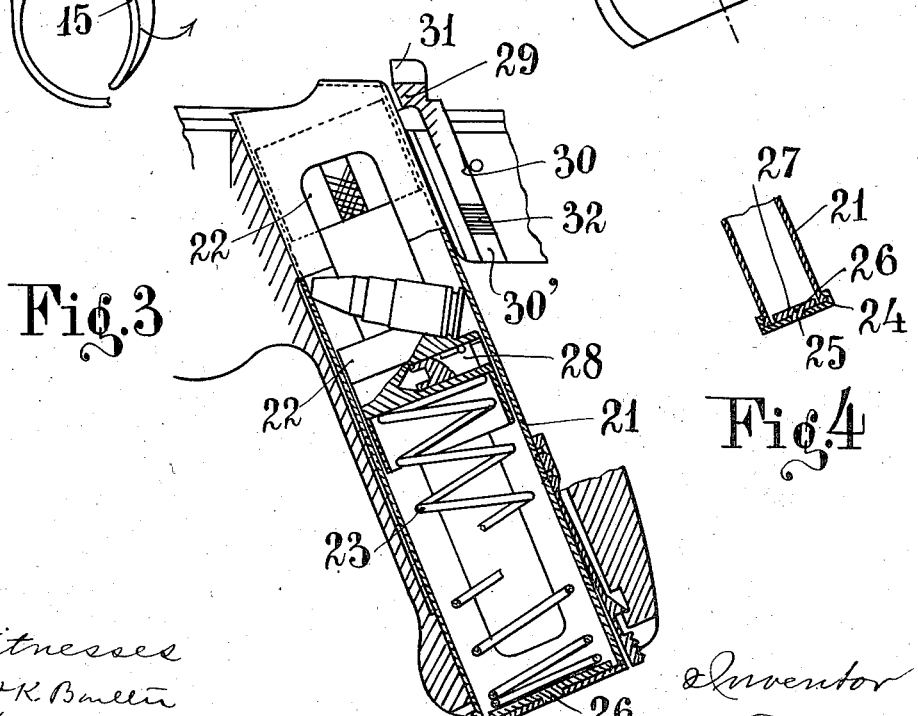
Witnesses
Inventor
Vittorio Falco,
By Wm E Boulter, attorney

V. FALCO.
AUTOMATIC PISTOL.
APPLICATION FILED APR. 18, 1913.

1,089,195.

Patented Mar. 3, 1914.
3 SHEETS—SHEET 2.

Witnesses:
Inventor
Vittorio Falco,
By Wm. C. Boulter
Attorney

V. FALCO.
AUTOMATIC PISTOL.
APPLICATION FILED APR. 18, 1913.
1,089,195.
Patented Mar. 3, 1914.
3 SHEETS—SHEET 3.
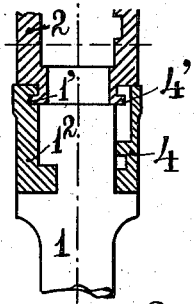
Fig.1ª
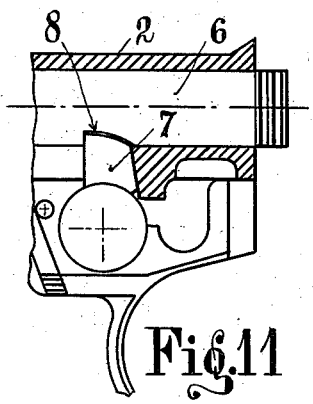
Fig.11
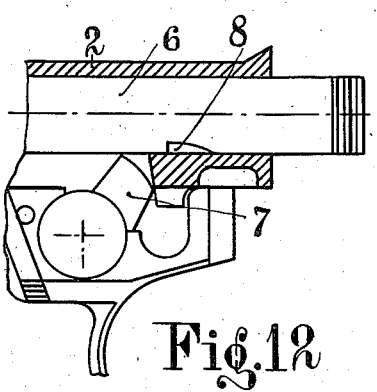
Fig.12
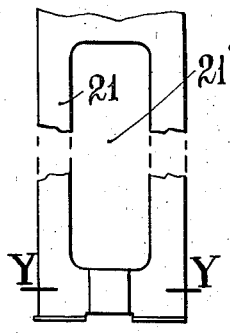
Fig.13
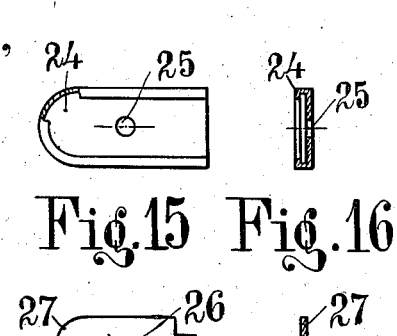
Fig.15  Fig.16
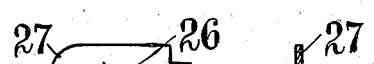
Fig.17  Fig.18
Fig.14
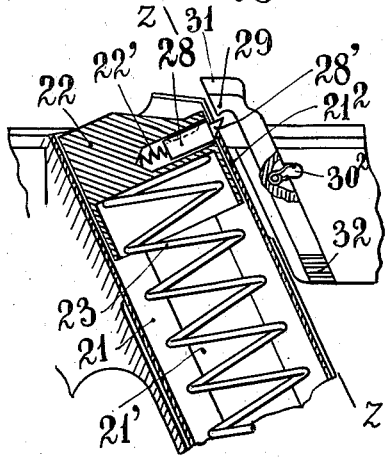
Fig.19
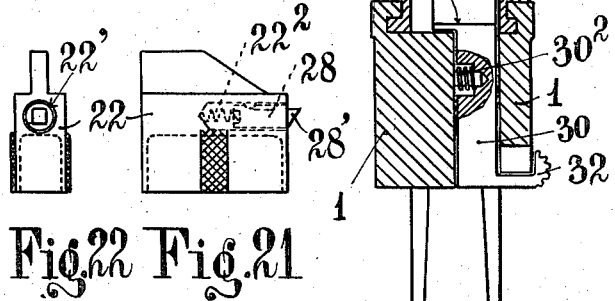
Fig.22  Fig.21
Fig.20
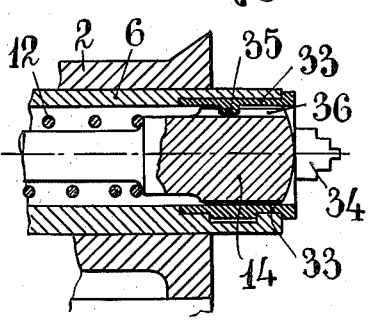
Fig.23
Witnesses:
Inventor
Vittorio Falco,
By Wm. E. Boulter,
attorney

UNITED STATES PATENT OFFICE.

VITTORIO FALCO, OF TURIN, ITALY, ASSIGNOR TO METALLURGICA BRESCIANA GIÀ TEMPINI, OF BRESCIA, ITALY, A COMPANY ORGANIZED UNDER THE LAWS OF ITALY.

AUTOMATIC PISTOL.

1,089,195. Specification of Letters Patent. Patented Mar. 3, 1914.

Application filed April 18, 1913. Serial No. 761,997.

*To all whom it may concern:*

Be it known that I, VITTORIO FALCO, a subject of the King of Italy, residing in Turin, Italy, have invented certain new and useful Improvements in or Relating to Automatic Pistols, of which the following is a specification.

This invention relates to automatic pistols with recoiling barrel and bolt mechanism and consists in a special construction comprising parts and arrangements intended to increase the safety of the pistol, as well as to facilitate its manipulation.

The accompanying drawing shows by way of example an automatic pistol according to this invention.

Figure 5:
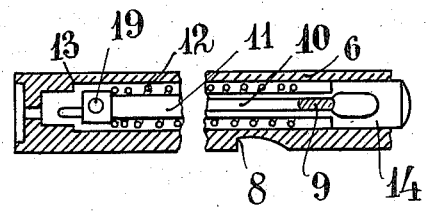
Figure 6:
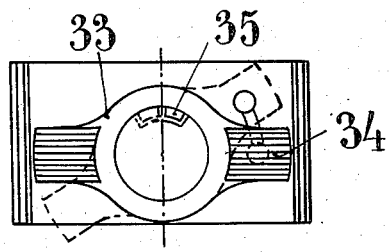
Figure 7:
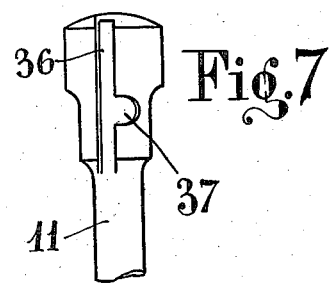
Figure 8:
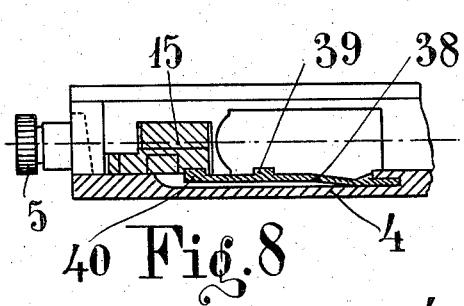
Figure 9:
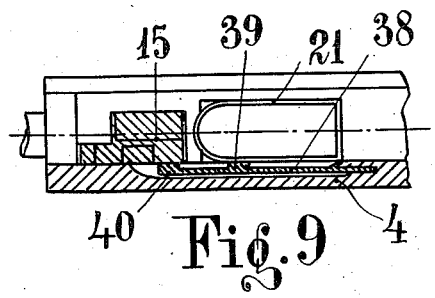
Figure 10:
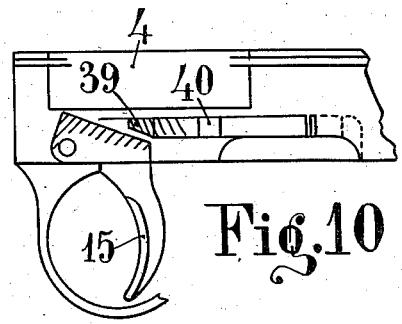

Figure 1 is a longitudinal section through the complete pistol, Fig. 1$^a$ is a cross-section of the front part of the pistol casing. Fig. 2 shows in detail the trigger mechanism, Fig. 3 is a detail view of the handle with the magazine in its interior, Fig. 4 is a cross-section of the bottom of the magazine, Fig. 5 shows in detail the bolt in longitudinal section, Fig. 6 shows on an enlarged scale a safety device for locking the firing pin, and Fig. 7 shows the end of the firing pin on which acts the safety device. Figs. 8 and 9 are views in plan on line X—X of Fig. 1, showing another safety device intended to prevent the bolt from working, and Fig. 10 is a lateral elevation of the said device. Figs. 11 and 12 show in detail the rear end of the pistol in two positions of working. Fig. 13 is a side elevation of the magazine. Fig. 14 is a cross-section thereof on line Y—Y of Fig. 13. Fig. 15 is a front view of the part closing the magazine. Fig. 16 is a cross-section thereof. Fig. 17 shows the plate for locking the part closing the magazine. Fig. 18 is a cross-section thereof. Fig. 19 shows the magazine in detail and in section the elevator being raised to its extreme position. Fig. 20 is a cross-section on line z—z of Fig. 19 showing how the tooth raised by the elevator is mounted. Fig. 21 shows in detail a side elevation of the elevator. Fig. 22 is a front view thereof. Fig. 23 shows on a larger scale a longitudinal section of the rear end of the bolt to show the mounting of the sleeve locking the firing pin.

As may be seen from Figs. 1 and 1$^a$, the pistol comprises a casing 1 forming a grooved guide in which slides the breech 2 secured to the barrel 3. The said breech is provided with lateral projections 2' engaging two grooves 1' and 4' provided respectively on the side 1$^2$ of the casing and on a detachable part 4 which completes the casing of the pistol and can be screwed in position by a screw 5 (Figs. 8–9). The bolt 6 is mounted in the breech 2; the block 7 is pivoted to the casing and is intended to lock both the breech and the firing pin in their position of rest (Fig. 11), whereas when the breech moves back when the shot is fired, this block 7 is caused to turn (owing to the breech being displaced) and therefore to leave the recess 8 of the bolt, so that the latter is free to continue to travel independently of the breech (see Fig. 12). The recoil of the breech is stopped by the casing, while the bolt is stopped by the cross pin 9 secured to the casing and passing through a slot 10 provided in the bolt 6 and in the firing pin 11. The firing pin is surrounded by a spiral spring 12 abutting with its rear end against the pin 9, the front end of the said spring being able to abut against the inner projections 13 of the obturator (Fig. 5). In that way, the spring 12 forms a "storing" or accumulator spring for the bolt, for during the return travel of the latter, it presses against the cross pin 9 and it is also used to retract the point of the firing pin after the firing of a shot, as this spring stops with its front end against the projections 13 while the firing pin advances, whereas the head 14 of the firing pin compresses the spring which then expands, slightly retracts the firing pin and thus causes the point to retract also (Fig. 5).

The trigger mechanism is shown in detail in Fig. 2 and comprises the trigger 15 pivoted to the casing 1, and a sear 16 pivoted to the trigger and intended to engage with a tooth 17 of a lever 18 rotating in the breech and normally affording with its other end a point of support for a pin 19 secured to the firing pin and projecting laterally at the front end of the bolt.

A single spring 20 keeps the trigger 15 and the sear 16 in their normal position shown in Fig. 2. The magazine is shaped as shown in detail in Figs. 13 and 14 and is formed by a tube 21 a section of which is shown in Fig. 14; the said tube has on each side an opening 21' and it carries the elevator 22 (Figs. 3 and 19) which is pushed up by a spiral spring 23. The lower part of the magazine is closed (Fig. 4) by a part 24 shown in Figs. 15-16, which part is provided with a hole 25 and can be slidably mounted on the end of the magazine. A plate 27 provided with a projection 26 (Figs. 17-18) is introduced in the magazine 21 and placed against the sliding plate 24 so as to be pushed against the latter by the spring 23 of the elevator. In this way, the projection 26 of the plate 27 by engaging the hole 25 of the plate 24 locks the latter under the action of the same spring 23 which raises the elevator.

The magazine is provided at the upper end of its rear wall with a slot $21^2$ through which projects the tooth 28′ of a button 28 when the latter reaches the height of the said slot, the said button 28 being placed in a cylindrical recess 22′ of the elevator 22 and pushed outward by a spring $22^2$ (Figs. 19-21 and 22). The tooth 28′ can engage the tooth 29 of the part 30 mounted in a recess 30′ of the casing and normally pushed downward by a spring $30^2$ (Figs. 3, 19 and 20).

30 constitutes the ejector, for with its tooth 31 it strikes the cartridge case carried backward during the recoil of the bolt, and at the same time, when it is raised by the button 28, keeps the bolt open with the empty magazine. Finally, the said tooth 31 can be raised by hand by means of a milled button 32 projecting from the cheek, and in that way the bolt can be held open for cleaning or examining the pistol.

The pistol comprises two safety devices, one of which, intended to lock the firing pin, is shown in Figs. 6, 7 and 23. This safety device comprises a sleeve 33 rotatably mounted at the rear end of the bolt and surrounding the head 14 of the firing pin 11; projections 34 are provided on the said sleeve. The head 14 of the firing pin is provided with a longitudinal groove 36 provided toward its middle part with a lateral extension 37. The sleeve is provided inside with a tooth 35 which normally engages the groove 36 of the head 14 and can engage the extension 37 when the sleeve is rotated (as shown for instance in dotted lines in Fig. 6). It will be readily understood that as long as the tooth 35 of the sleeve 33 engages the groove 36, the firing pin can move inside the bolt, i. e. the working of the firing pin is not stopped, whereas if the sleeve is rotated and its tooth 35 engages the extension 37 of the groove 36, the firing pin is rigidly connected to the bolt by means of the said sleeve 33 which can only rotate in the bolt. The other safety device is used for preventing any movement of the trigger when the magazine is removed, and in that way prevents any cartridge contained in the barrel from being fired; thus eliminating the most frequent cause of accidents, for there is no possibility of firing when, the magazine having been removed, it is assumed that the pistol is empty. The other safety device shown in Figs. 8 to 10 is controlled by the magazine and comprises a flat spring 38 secured at one of its ends to one of the inner walls of the chamber in which the magazine 21 is inserted. This spring has a tendency to move toward the inside of the chamber and is provided with two projections, one of which 39, abuts against the wall of the magazine 21 when the latter is in position, the other 40 arranged at the end of the spring 38 is immediately above the trigger 15.

When the magazine 21 is in position, the projection 39 rests against the wall of the said magazine and keeps back the end of the spring 38, so that the projection 40 keeps the trigger lever free, but when the magazine is removed, the spring 38 having no bearing moves away from the wall on which it is mounted, the tooth 40 then coming in front of the trigger lever and locking it.

The working of the pistol will be readily understood from the foregoing description. The result of firing a shot will be that the breech 2 will recoil, turn the block 7, and consequently the bolt 6 with the firing pin will continue to travel until the bottom of the slot 10 strikes the pin 9. During that travel, the empty cartridge case is ejected by the action of the tooth 31. During the next forward travel of the bolt, brought about by the spring 12, the bolt pushes into the barrel a new cartridge which the elevator 22 has raised into the breech, and the firing pin stops, with its lateral pin 19 engaging with the end of the lever 18.

In order to fire a shot, it is then sufficient to pull the trigger 15 which, by means of the pawl 16, brings about the rotation of the lever 18, and consequently releases the firing pin pushed by its spring 12 against the primer, unless the sleeve 32 has been turned into the safety position, in which case the firing pin is locked by the projection 35.

As soon as the elevator has pushed the last cartridge into the breech the button 28 projects through the slot of the magazine and raises the ejector 30 which, by means of its tooth 31 stops the bolt in the open position, which forms an indication that the magazine is empty.

During the changing of the magazine, there is the certainty that the pistol cannot be fired, as the spring 38 brings the projection 40 against the trigger which is thus locked.

What I claim as my invention and desire to secure by Letters Patent is:—

1. In an automatic pistol, a casing comprising a recess, a breech mounted thereon, a trigger pivoted to the casing, a flat spring mounted on the casing and having the tendency to bring a projection into a position for locking the trigger, a second projection arranged on the said spring and projecting into the recess in the casing, and a magazine in said recess pressing against the said projection, in order normally to maintain in inoperative position the stop for the trigger.

2. In an automatic pistol, a casing having a recess, a breech mounted thereon, a bolt mounted in the interior of the said breech, a magazine in the interior of the said recess, an elevator guided in the interior of the magazine, a spring having the tendency to raise the said elevator, a spring-controlled button mounted on the said elevator and capable of projecting through a slot in the wall of the magazine, at the upper end of its travel, and a tooth adjustably mounted in the path of the button of the elevator and capable, when raised, of locking the bolt in the open position.

3. In an automatic pistol, a casing having a recess, a breech mounted thereon, a bolt mounted in the interior of the said breech, a magazine introduced into the interior of the said recess, an elevator guided in the interior of the magazine, a spring having the tendency to raise the said elevator, a spring-controlled button mounted on the said elevator and capable of projecting through a slot in the wall of the magazine, at the upper end of its travel, a tooth adjustably mounted in the path of the button of the elevator, the said tooth being adapted, when raised, to stop the bolt in the open position, and a button connected to the said tooth for its operation by hand.

4. In an automatic pistol, a casing having a recess, a breech mounted thereon, a magazine introduced into the said recess, an elevator guided in the interior of the magazine, a spring arranged in the magazine below the elevator, a sliding part closing the bottom wall of the magazine, a hole made in the said part, a plate in the interior of the magazine, pushed against the closing part by the inner spring of the magazine, and a projection on the surface of the said plate facing the closing part, the said projection being intended to engage with the hole of the closing part when the latter is in place.

5. In an automatic pistol, a casing, a breech mounted thereon, a bolt mounted in the said breech, a firing pin adjustable in the interior of the bolt, a sleeve mounted so as to turn in the rear end of the bolt and surrounding the head of the firing pin, means for operating the said sleeve, a projection arranged in the interior of the said sleeve, a longitudinal groove in the head of the firing pin and intended to contain the projection of the sleeve, and a lateral extension of the said groove with which engages the projection of the sleeve when the latter is turned for the purpose of locking the firing pin.

In testimony whereof I have signed my name to this specification in the presence of two subscribing witnesses.

VITTORIO FALCO.

Witnesses:
CARLO TOSTA,
JOCELYN GOUBEYRAN.